(12) United States Patent
Roennow et al.

(10) Patent No.: US 11,756,022 B2
(45) Date of Patent: Sep. 12, 2023

(54) METHODS, APPARATUS AND COMPUTER PROGRAMS FOR ENABLING TRANSACTIONS USING DIGITAL ATTRIBUTES

(71) Applicant: Nokia Technologies Oy, Espoo (FI)

(72) Inventors: Troels Roennow, Cambridge (GB); Karina Palyutina, Cambridge (GB); Enrique Martin-Lopez, Cambridge (GB); Hongwei Li, Cambridge (GB); David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 68 days.

(21) Appl. No.: 16/614,601

(22) PCT Filed: Jun. 14, 2018

(86) PCT No.: PCT/EP2018/065886
§ 371 (c)(1),
(2) Date: Nov. 18, 2019

(87) PCT Pub. No.: WO2018/229228
PCT Pub. Date: Dec. 20, 2018

(65) Prior Publication Data
US 2020/0111078 A1 Apr. 9, 2020

(30) Foreign Application Priority Data

Jun. 16, 2017 (EP) .................................... 17176289

(51) Int. Cl.
*G06Q 20/32* (2012.01)

(52) U.S. Cl.
CPC ..... *G06Q 20/3227* (2013.01); *G06Q 20/3223* (2013.01); *G06Q 20/3224* (2013.01); *G06Q 20/321* (2020.05)

(58) Field of Classification Search
None
See application file for complete search history.

(56) References Cited

U.S. PATENT DOCUMENTS

| 5,383,500 A | 1/1995 | Dwars et al. |
| 6,338,008 B1 | 1/2002 | Kohut et al. |

(Continued)

FOREIGN PATENT DOCUMENTS

| CN | 105844799 A | 8/2016 |
| CN | 106525063 A | 3/2017 |

(Continued)

OTHER PUBLICATIONS

Oral Proceedings received for corresponding European Patent Application No. 17176289.1, dated Mar. 5, 2020, 10 pages.

(Continued)

*Primary Examiner* — Namrata Boveja
*Assistant Examiner* — Amit Patel
(74) *Attorney, Agent, or Firm* — DITTHAVONG, STEINER & MLOTKOWSKI (57) ABSTRACT

A method, apparatus and computer program, the method comprising: selecting a transaction entity for a mobile entity wherein a digital attribute account is associated with the mobile entity; and assigning one or more items of digital attributes from the digital attribute account associated with the mobile entity to the selected transaction entity such that the assigned items can only be used for transactions between the mobile entity and the selected transaction entity.

20 Claims, 6 Drawing Sheets

(56) References Cited

U.S. PATENT DOCUMENTS

| | | |
|---|---|---|
| 2013/0018705 A1 | 1/2013 | Heath et al. |
| 2014/0279403 A1 | 9/2014 | Baird et al. |
| 2014/0279544 A1 | 9/2014 | Baird et al. |
| 2016/0342958 A1 | 11/2016 | Thomas et al. |
| 2017/0017955 A1 | 1/2017 | Stern et al. |

FOREIGN PATENT DOCUMENTS

| | | |
|---|---|---|
| IN | 03181CH2014 A | 2/2016 |
| WO | 2012119255 A1 | 9/2012 |

OTHER PUBLICATIONS

Oral Proceedings received for corresponding European Patent Application No. 17176289.1, dated Jan. 20, 2021, 21 pages.

Poon et al., "The Bitcoin Lightning Network: Scalable Off-Chain Instant Payments", Lightning Network, Jan. 14, 2016, pp. 1-59.

"Irreversible Transactions", Wikipedia, Retrieved on Nov. 14, 2019, Webpage available at: https://en.bitcoin.it/wiki/Irreversible_Transactions.

"Driverless Car Market Watch", Driverless Future.Com, Retrieved on Nov. 14, 2019, Webpage available : at http://www.drive riess-future.com/.

"IBM's Watson integrates Visa Token Service to enable tokenized payments on connected devices", NFCW, Retrieved on Nov. 14, 2019, Webpage available at : https://www.nfcw.com/2017/02/16/350270/ibms-watson-integrates-visa-token-service-enable-tokenized-payments-connected-devices/.

Extended European Search Report received for corresponding European Patent Application No. 17176289.1, dated Nov. 13, 2017, 8 pages.

International Search Report and Written Opinion received for corresponding Patent Cooperation Treaty Application No. PCT/EP2018/065886, dated Jul. 26, 2018, 12 pages.

Office Action for related European Patent Application No. 21195274.2-1218, dated Apr. 21, 2022, 8 pages.

Office Action for related Chinese Patent Application No. 2018800396575, dated Mar. 31, 2023, 37 pages.

METHODS, APPARATUS AND COMPUTER PROGRAMS FOR ENABLING TRANSACTIONS USING DIGITAL ATTRIBUTES

RELATED APPLICATION

This application was originally filed as PCT Application No. PCT/EP2018/065886 filed Jun. 14, 2018 which claims priority benefit of EP Patent Application 17176289.1 filed Jun. 16, 2017.

TECHNOLOGICAL FIELD

Examples of the disclosure relate to methods, apparatus and computer programs for enabling transactions using digital attributes. In particular they relate to methods, apparatus and computer programs for enabling transactions using digital attributes between mobile entities and transaction stations.

BACKGROUND

Digital attributes such as digital currencies or digital authentications, enable transactions between two or more entities. For example digital currencies enable value to be digitally transferred between two or more entities. Digital authentications may enable signatures or other identification means to be transferred between different entities.

Such transactions may involve verification processes that can take several minutes. This may be particularly problematic for mobile entities which may be required to wait until a transaction has been verified before they can disconnect from a transaction entity.

BRIEF SUMMARY

According to various, but not necessarily all, examples of the disclosure there is provided a method comprising: selecting a transaction entity for a mobile entity wherein a digital attribute account is associated with the mobile entity; and assigning one or more items of digital attributes from the digital attribute account associated with the mobile entity to the selected transaction entity such that the assigned items can only be used for transactions between the mobile entity and the selected transaction entity.

The assigned items may comprise a quantity of digital currency and the quantity of digital currency enables a micropayment to be made between the mobile entity and the selected transaction entity so that a transaction can be completed and the mobile entity can disconnect from the selected transaction entity before a network database is updated.

The method may comprise maintaining a record of the micropayments and enabling, at least part of, the record to be provided to a digital currency network after the mobile entity has disconnected from the transaction entity.

The one or more items of digital attributes may be temporarily assigned to the selected transaction entity.

The method may comprise updating the selected transaction entity by selecting a further transaction entity and retracting the one or more items of digital attributes associated with the selected transaction entity and reassigning one or more items of digital attributes to the further transaction entity.

A transaction entity may be selected based on at least one of; a predicted route of the mobile entity, a current location of the mobile entity, goods and/or service requirements of the mobile entity, availability of goods and/or services at the transaction entities. The current location of the mobile entity may be obtained using at least one of; one or more location sensors on the mobile entity, one or more observations from an external observation entity.

The mobile entity may comprise identification means which enables the mobile entity and the digital attribute account associated with the mobile entity to be identified.

The method may comprise restricting transactions from the digital attribute account associated with the mobile entity so that the one or more items of digital attributes assigned to the selected transaction entity cannot be used at any other transaction entity.

According to various, but not necessarily all, examples of the disclosure there is provided an apparatus comprising: means for selecting a transaction entity for a mobile entity wherein a digital attribute account is associated with the mobile entity; and means for assigning one or more items of digital attributes from the digital attribute account associated with the mobile entity to the selected transaction entity such that the assigned items can only be used for transactions between the mobile entity and the selected transaction entity.

According to various, but not necessarily all, examples of the disclosure there is provided an apparatus comprising means for performing any of the previously described methods.

According to various, but not necessarily all, examples of the disclosure there is provided an apparatus comprising processing circuitry; and memory circuitry including computer program code, the memory circuitry and the computer program code configured to, with the processing circuitry, enable the apparatus to: select a transaction entity for a mobile entity wherein a digital attribute account is associated with the mobile entity; and assign one or more items of digital attributes from the digital attribute account associated with the mobile entity to the selected transaction entity such that the assigned items can only be used for transactions between the mobile entity and the selected transaction entity.

According to various, but not necessarily all, examples of the disclosure there is provided an apparatus comprising processing circuitry; and memory circuitry including computer program code, the memory circuitry and the computer program code configured to, with the processing circuitry, enable the apparatus to perform any of the previously described methods.

According to various, but not necessarily all, examples of the disclosure there is provided a computer program comprising computer program instructions that, when executed by processing circuitry, enables: selecting a transaction entity for a mobile entity wherein a digital attribute account is associated with the mobile entity; and assigning one or more items of digital attributes from the digital attribute account associated with the mobile entity to the selected transaction entity such that the assigned items can only be used for transactions between the mobile entity and the selected transaction entity.

According to various, but not necessarily all, examples of the disclosure there is provided a method comprising: receiving, at a transaction entity, a request for a transaction from a mobile entity; determining if the mobile entity has a digital attribute account comprising a one or more items of digital attributes assigned to the transaction entity; enabling, if it is determined that the mobile entity has a digital attribute account assigned to the transaction entity, one or more transactions between the mobile entity and the transaction entity using the one or more items of digital attributes assigned to the transaction entity.

The method may comprise enabling a network database to be updated after the mobile entity has disconnected from the transaction entity.

According to various, but not necessarily all, examples of the disclosure there is provided an apparatus comprising: means for receiving, at a transaction entity, a request for a transaction from a mobile entity; means for determining if the mobile entity has a digital attribute account comprising a one or more items of digital attributes assigned to the transaction entity; and means for enabling, if it is determined that the mobile entity has a digital attribute account assigned to the transaction entity, one or more transactions between the mobile entity and the transaction entity using the one or more items of digital attributes assigned to the transaction entity.

According to various, but not necessarily all, examples of the disclosure there is provided an apparatus comprising processing circuitry; and memory circuitry including computer program code, the memory circuitry and the computer program code configured to, with the processing circuitry, enable the apparatus to: receive, at a transaction entity, a request for a transaction from a mobile entity; determine if the mobile entity has a digital attribute account comprising a one or more items of digital attributes assigned to the transaction entity; enable, if it is determined that the mobile entity has a digital attribute account assigned to the transaction entity, one or more transactions between the mobile entity and the transaction entity using the one or more items of digital attributes assigned to the transaction entity.

According to various, but not necessarily all, examples of the disclosure there is provided a computer program comprising computer program instructions that, when executed by processing circuitry, enables: receiving, at a transaction entity, a request for a transaction from a mobile entity; determining if the mobile entity has a digital attribute account comprising a one or more items of digital attributes assigned to the transaction entity; and enabling, if it is determined that the mobile entity has a digital attribute account assigned to the transaction entity, one or more transactions between the mobile entity and the transaction entity using the one or more items of digital attributes assigned to the transaction entity.

According to various, but not necessarily all, examples of the disclosure there is provided a method comprising: maintaining a database of digital attribute accounts wherein at least one digital attribute account is associated with a mobile entity; maintaining a record of one or more items of digital attributes assigned between a mobile entity and a selected transaction entity such that an assigned one or more items of digital attributes can only be used for transactions by the mobile entity at the selected transaction entity.

According to various, but not necessarily all, examples of the disclosure there is provided an apparatus comprising: means for maintaining a database of digital attribute accounts wherein at least one digital attribute account is associated with a mobile entity; means for maintaining a record of one or more items of digital attributes assigned between a mobile entity and a selected transaction entity such that an assigned one or more items of digital attributes can only be used for transactions by the mobile entity at the selected transaction entity.

According to various, but not necessarily all, examples of the disclosure there is provided an apparatus comprising processing circuitry; and memory circuitry including computer program code, the memory circuitry and the computer program code configured to, with the processing circuitry, enable the apparatus to maintain a database of digital attribute accounts wherein at least one digital attribute account is associated with a mobile entity; maintain a record of one or more items of digital attributes assigned between a mobile entity and a selected transaction entity such that an assigned one or more items of digital attributes can only be used for transactions by the mobile entity at the selected transaction entity.

According to various, but not necessarily all, examples of the disclosure there is provided a computer program comprising computer program instructions that, when executed by processing circuitry, enables: maintaining a database of digital attribute accounts wherein at least one digital attribute account is associated with a mobile entity; maintaining a record of one or more items of digital attributes assigned between a mobile entity and a selected transaction entity such that an assigned one or more items of digital attributes can only be used for transactions by the mobile entity at the selected transaction entity.

BRIEF DESCRIPTION

For a better understanding of various examples that are useful for understanding the detailed description, reference will now be made by way of example only to the accompanying drawings in which.

DETAILED DESCRIPTION

The Figures illustrate apparatus 1, methods and computer programs which enable transactions between mobile entities 23 and transaction entities 25 such as transaction stations 25 using digital attribute. The methods involve selected a transaction entity 25 where a mobile entity 23 could make a transaction. For instance the transaction entity 25 could be selected based on a predicted route and/or location of the mobile entity 23. A quantity of the digital attributes associated with the mobile entity 23 is then assigned to the transaction entity 25. As the quantity of digital attribute is pre-assigned this may enable one or more transactions to be made between the mobile entity 23 and the selected transaction entity 25. A record of the one or more transactions may be stored locally at the mobile entity 23 and/or the selected transaction entity 25. This record could then be provided to the digital attribute network 27 to enable a network database 30 to be updated. This may enable the update of the network database 30 to take place after the mobile entity 23 has disconnected from the transaction entity 25 so that the mobile entity 23 does not need to wait for the network to verify the transaction before disconnecting. For instance a mobile entity 23 may be able to leave a transaction entity 25 and continue with a journey before the network has verified the transaction. This provides for a faster and more efficient system for enabling digital attribute transactions for mobile entities 23.

Figure 1:
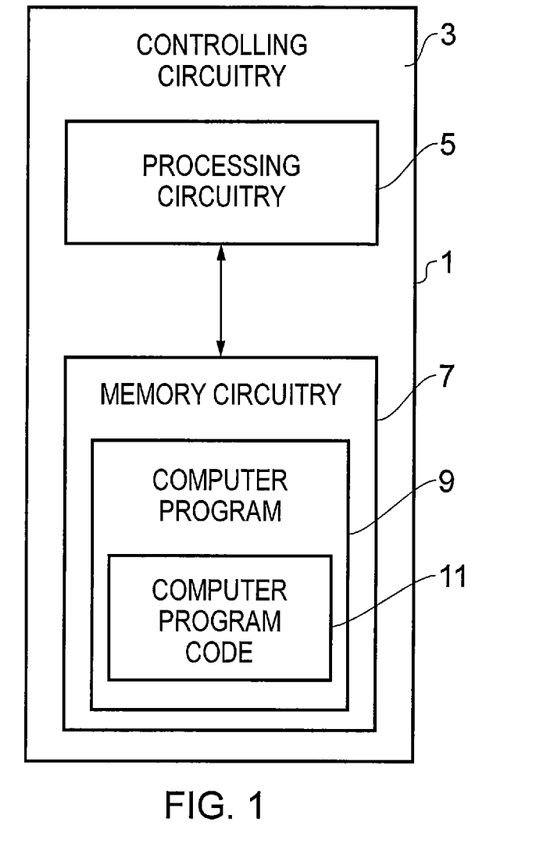
FIG. 1 illustrates an example apparatus.
Figure 2:
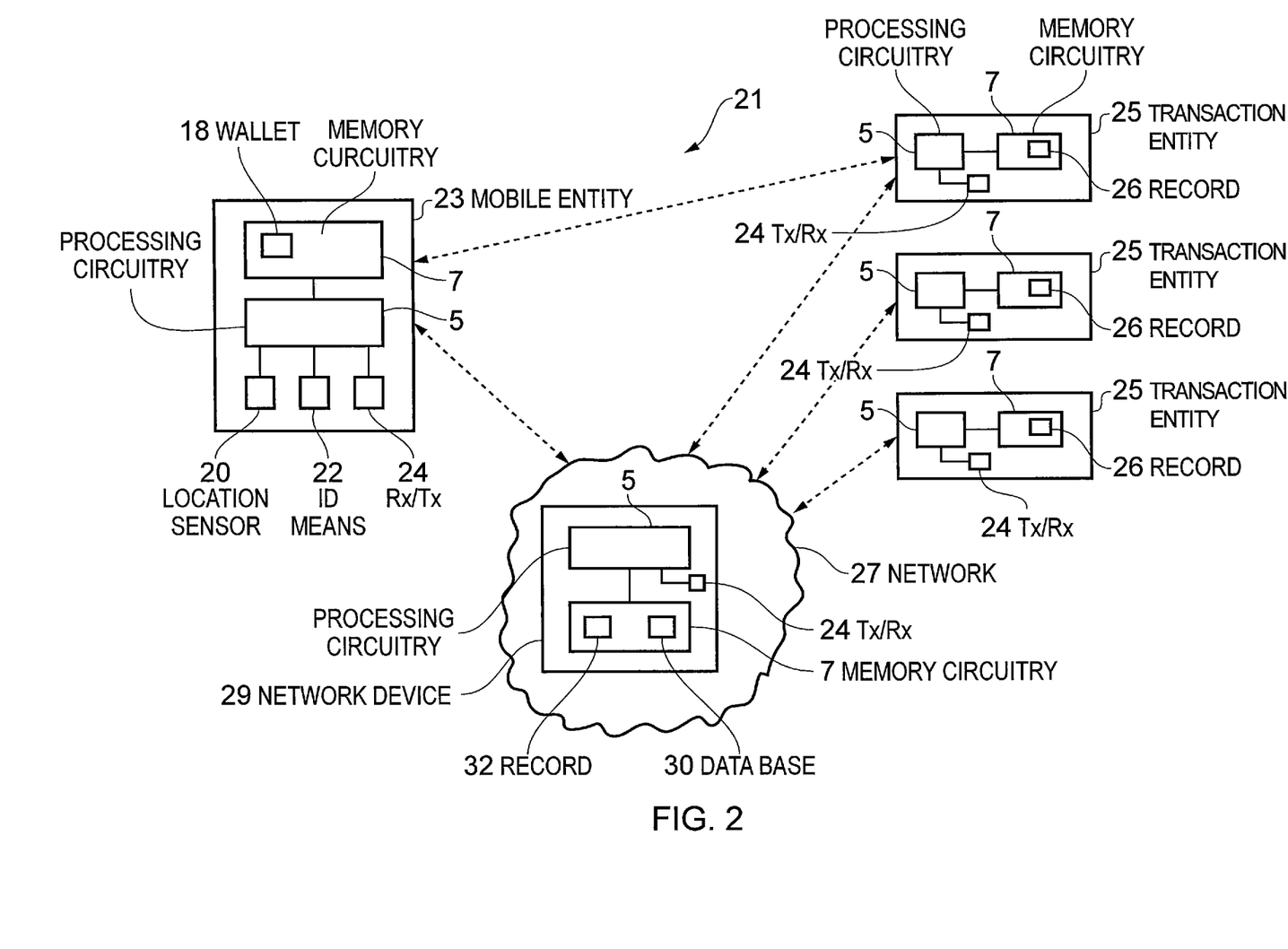
FIG. 2 illustrates an example system.

FIG. 1 schematically illustrates an apparatus 1 according to examples of the disclosure. The apparatus 1 illustrated in FIG. 1 may be a chip or a chip-set. In some examples the apparatus 1 may be provided within a mobile entity 23. The mobile entity 23 could be a vehicle, an electronic device provided within a vehicle or an electronic device which may be carried by a user. In some examples the apparatus 1 may be provided within a transaction entity 25 such as a transaction station 25 and/or network devices 29. Examples of mobile entities 23, transaction stations 25 and network devices 29 are shown in FIG. 2.

The apparatus 1 comprises a controlling circuitry 3. The controlling circuitry 3 may also provide means for performing the methods or at least part of the one or more methods of examples of the disclosure.

The apparatus 1 comprises a processing circuitry 5 and a memory circuitry 7. The processing circuitry 5 may be configured to read from and write to the memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store one or more computer programs 9 comprising computer program instructions (computer program code 11) that controls the operation of the apparatus 1 when loaded into processing circuitry 5. The computer program instructions, of the computer program 9, provide the logic and routines that enable the apparatus 1 to perform the example methods illustrated in FIGS. 3 to 6 and 8. The processing circuitry 5 by reading the memory circuitry 7 is able to load and execute the computer program 9.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 9. The apparatus may propagate or transmit the computer program 9 as a computer data signal. In some examples the computer program code 11 may be transmitted to the apparatus 1 using a wireless protocol such as Bluetooth, Bluetooth Low Energy, Bluetooth Smart, 6LoWPan (IPv6 over low power personal area networks) ZigBee, ANT+, near field communication (NFC), Radio frequency identification (RFID), wireless local area network (wireless LAN) or any other suitable protocol.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and the circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 schematically illustrates a system 21 which may be used to implement examples of the disclosure. In the example of FIG. 2 the system 21 comprises a mobile entity 23, one or more transaction entities 25 and a network 27 comprising one or more network devices 29.

The system 21 may be a digital attribute system such as a digital currency system or a part of a digital currency system. The digital currency system could comprise any currency system that enables value to be digitally transferred between two or more entities. The digital currency could be a cryptocurrency such as bitcoin, a virtual currency or any other suitable currency.

The mobile entity 23 comprises an apparatus 1 comprising memory circuitry 7 and processing circuitry 5 as described above. In the example of FIG. 2 the mobile entity 23 also comprises, a location sensor 20, identification means 22 and transceiver circuitry 24.

The mobile entity 23 could comprise any entity that may be moved between different transaction stations 25 and which may have a digital currency account associated with it. The mobile entity 23 may be free to move though a geographic area. In some examples the mobile entity 23 may comprise a vehicle. In some examples the vehicle could be an autonomous vehicle and/or a car sharing vehicle. This enables the vehicle to make one or more transactions without a user or a vehicle owner being involved in the one or more transactions. For instance it is not necessary for a user or owner to be within the vehicle or in a network connection with the vehicle. Other types of vehicle may be used in other examples of the disclosure. The apparatus 1 could be provided in any suitable location within the vehicle.

In some examples the mobile entity 23 could be a person. In such cases the apparatus 1 may be provided within an electronic device which may be carried or worn by the user. For instance the apparatus 1 could be provided within a personal electronic device such as a mobile phone which could be carried by a user or could be provided within an identification device such as a tag which could be attached to the user or the user's clothing.

The mobile entity 23 is associated with a digital currency account. The association with the digital currency account enables the mobile entity 23 to make transactions using the digital currency up to the value of the digital currency stored in the account. The digital account may store information indicating the value of the digital currency available to the mobile entity 23. The information stored in the digital currency account may be encrypted so that it can only be accessed by an authorised mobile entity 23 and/or an authorised user.

In the example of FIG. 2 the mobile entity 23 comprises a wallet 18. The wallet 18 may be stored in the memory circuitry 7 of the apparatus 1. The wallet 18 may comprise a quantity of digital currency from the digital currency account which is available for transactions.

In the example of FIG. 2 the mobile entity 23 also comprises a location sensor 20. The location sensor 20 may be arranged to read to and write from the processing circuitry 5. The location sensor 20 may enable the position, such as a geographic location, of the mobile entity 23 to be determined using a global navigation satellite system (GNSS), for example a global positioning system such as GPS. Alternatively or additionally, the position could be determined using a local wireless network, such as WLAN, Bluetooth transmitters, an indoor positioning system such as High accuracy indoor position systems, or any combination thereof. In some examples the position could be determined using a cellular communications network, or any other suitable network. Information indicative of the location of the mobile entity 23 may be stored in the memory circuitry 7 and/or provided to and stored in the memory circuitries 7 of other devices within the system 21 such as the one or more network devices 29 and the one or more transaction entities 25.

The mobile entity 23 also comprises identification and/or authentication means 22. The identification means 22 may comprises means which enables the mobile entity 23 to be securely identified and/or authenticated so as to enable a transaction with the transaction entity 25 using the digital currency. In some examples the identification means 22 could comprise a readable code such as registration plate on a vehicle or a bar code or QR code on a personal electronic device. These codes could be read by a scanner of an observation entity or any other suitable devices. In other examples the identification means 22 could comprise an RFID tag or any other machine readable device.

In some examples the identification means 22 could also be used to enable the location of the mobile entity 23 to be determined. For instance, the identification means 22 could be read by an observation entity. The observation entity could be a fixed entity such as a transaction station 25 which has a fixed geographic location. In such cases the location of the mobile entity 23 can be determined to be the location of the transaction station 25. In some examples the observation entity could comprise one or more other mobile entities 23 which may have known geographic locations. This may enable multiple entities to be used to verify the location of the mobile entity 23 and may prevent incorrect or fraudulent location information being used within the digital currency network 27.

The mobile entity also comprises transceiver circuitry 24. The transceiver circuitry 24 may be arranged to interface with the processing circuitry 5 to enable the processing circuitry 5 to control the transceiver circuitry 24. The transceiver circuitry 24 may comprise any means which enables the mobile entity 23 to communicate with the one or more transaction stations 25 and the one or more network devices 29 within the network 27. The transceiver circuitry 24 may enable wireless communications. The transceiver circuitry 24 could enable long range wireless communications and/or short range communications via any suitable protocol.

In the example system 21 of FIG. 2 one mobile entity 23 is shown. It is to be appreciated that in other examples of the disclosure the system 21 may comprise a plurality of mobile entities 23.

The system 21 also comprises a plurality of transaction entities 25. Three transaction entities 25 are shown in the example system of FIG. 2. It is it to be appreciated that other numbers of transaction entities 25 may be provided in other systems 21.

The transactions entities 25 may comprise any entity which may enable the mobile entity 23 to exchange digital currency in return for goods and/or services. The transaction entities 25 may be geographically distributed so that the mobile entity 23 can move between the transaction entities 25. The transaction entities 25 could be transaction stations which may be used by vehicle such as fuel stations which may enable vehicles to be refuelled in exchange for digital currency, toll booths which may enable a vehicle to access a route in exchange for digital currency, parking meters which may enable the vehicle to park in exchange for digital currency or any other suitable stations. In other examples the transaction entities 25 could be transaction entities 25 that could be used by users carrying or wearing a mobile entity 23. For instance a transaction entity 25 could be a shop or café which may enable a user to exchange digital currency for food and/or drink. This could be use by a runner or any other suitable user who then only needs to carry the mobile entities 23 to buy goods and services while they are making a journey.

The transaction entities 25 may comprise an apparatus 1 which may be as described above. In the example of FIG. 2 the transaction entities 25 may also comprise transceiver circuitry 24 which may be controlled by the processing circuitry 5 to enable the transaction entities 25 to communicate with the mobile entity 23 and/or one or more network devices 29 within the digital currency network 27. In some examples the transceiver circuitry 24 may enable the transaction entities 25 to communicate with the mobile entity 23 via the digital currency network. In some examples the transceiver circuitry 24 may enable the transaction entities 25 to communicate directly with the mobile entity 23.

The transaction entities 25 are also associated with digital currency accounts which enables the transaction entities 25 to make and receive payments using the digital currency. The digital currency accounts may be updated whenever a transaction is made. In the example of FIG. 2 a record 26 of the transactions is stored in the memory circuitry 7 of the transaction entities 25. This record 26 could then be provided to the digital currency network 27 to enable the network database 30 to be updated. The record 26 could be provided at predetermined intervals. The record 26 could be provided to the network 27 after one or more micropayments have been made.

The record 26 may also comprise information indicative of mobile entities 23 that have quantities of digital currency assigned to the transaction entities 25. The record may comprise an identification of the mobile entities 23 and also an indication of the quantity of the digital currency that is assigned to the transaction entity 25. The transaction entities 25 may accept micropayments from the mobile entity 23 up to the value of the quantity that has been assigned to the transaction entities 25. The micropayments may enable the mobile entity 23 to disconnect from and leave the transaction entity 25 before the transaction has been added to the network database 30 and/or verified by the network. The transaction entities 25 may be arranged to prevent micropayments above the value assigned to the transaction entities 25 so as to prevent fraudulent use of the digital currency and double spending.

The digital currency network 27 may comprise any network that enables the exchange of digital currency between the mobile entities 23 and the transaction entities 25. The digital currency network 27 may comprise one or more network devices 29. Only one network device 29 is shown in FIG. 2 however any number of network devices 29 may be provided in other examples of the disclosure. The network devices 27 may be remote from the mobile entities 23 and the transaction entities 25.

The network device 29 also comprises apparatus 1 which may comprise processing circuitry 5 and memory circuitry 7 as described above. The network device 29 also comprises transceiver circuitry 24 which interfaces with the processing circuitry 5 to enable the processing circuitry 5 to control the transceiver circuitry 24.

The network devices 29 may enable a network database 30 to be maintained. The network database 30 may comprise a record of all transactions that have occurred between the mobile entities 23 and the transaction entities 25 and the quantity of the digital currency that is available in the accounts associated with the mobile entities 23 and the transaction entities 25. The network database 30, or at least a part of the network database 30 may be stored in the memory circuitry 7 of the network device 29.

The network database 30 may be a distributed database where different portions of the database are stored in the memory circuitry 7 of different network devices 7. The different portions of the network database 30 may be timestamped and may comprise links to other portions of the network database 30. The distributed database may be managed using peer-to-peer architecture. This may provide for a secure database which does not require data to be centrally stored. In some examples the network database 30 may comprise a network ledger such as a blockchain or any other suitable type of database.

In examples of the disclosure the network device 29 also enables a record 32 of transaction entities 25 and quantities of digital currency that are assigned from the mobile entities 23 to be maintained. This may be used in examples of the disclosure to enable fast transactions between the mobile entity 23 and the transaction entities 25 and to prevent double spending of the digital currency. This record 32 may be stored in the memory circuitry 7 of the network device 29 and may be updated in response to communications from the mobile entities 23 and the transaction entities 25.

In the example of FIG. 2 the system 21 is a digital currency system in which enables value to be exchanged digitally between the mobile entities 23 and the transaction entities 25. It is to be appreciated that other types of digital attribute systems could be used in other examples of the disclosure. For example the digital attributes could comprise digital authentications which may enable the authentication and verification of mobile entities 23 by transaction entities 25.

Figure 3:
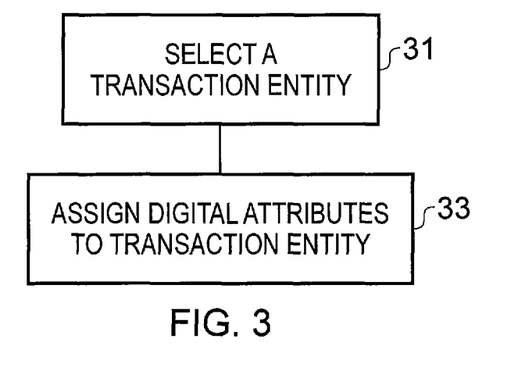
FIG. 3 illustrates an example method which could be implemented by an apparatus of a mobile entity.

FIG. 3 illustrates an example method which could be implemented, at least in part, by an apparatus 1 of a mobile entity 23.

The method comprises, at block 31, selecting a transaction entity 25 for a mobile entity 23 where a digital attribute account is associated with the mobile entity 23. The digital attribute account could be a digital currency account, a digital authentication account or any other suitable type of account.

The selected transaction entity 25 could be a transaction entity 25 at which the mobile entity 23 is estimated to want to make a transaction.

In some examples the transaction entity 25 could be selected in response to a trigger event. The trigger event could be a parameter of the mobile entity 23 dropping below a threshold level. For instance, the trigger event could comprise the fuel level or battery storage level of the mobile entity 23 dropping below a threshold. In other examples the trigger event could comprise the mobile entity 23 entering a geographical area or any other suitable trigger event or combination thereof. After the trigger event has been detected the transaction entity 25 may be selected automatically without requiring any input from a user of the mobile entity 23.

Additionally or alternatively, in some examples the transaction station 25 could be selected in response to a user input. The user input could be made via a user interface of the mobile entity 23. For instance the user of the mobile entity 23 could decide that they wish to purchase goods or services and may make a user input requesting a transaction entity 25 that provides such goods and services to be selected.

The transaction entity 25 may be selected using any suitable process. The transaction entity 25 may be selected from a group of available transaction entities 25 as the transaction entity 25 which best meets the requirements of the mobile entity 23. The processing circuitry 7 may analyse the requirements of the mobile entity 23 and compare these to the available transaction entities 25 to select the best matched transaction entity 25 for the mobile entity 23.

Any suitable factors and/or combinations of factors may be used to select the transaction entity 25 for the mobile entity 23. In some examples the transaction entity 25 may be selected based on a predicted route of the mobile entity 23. For instance transactions entities 25 along a route being traveled by the mobile entity 23 could be identified. The transaction entities 25 that the mobile entity 23 is most likely to use could then be selected from the sub set of identified transaction entities 25.

Additionally or alternatively in some examples the transaction entity 25 could be selected based on the current location of the mobile entity 23. For instance, the location of the mobile entity 23 could be determined using the location sensor 20 or any other suitable means. The transaction entity 25 closest to the mobile entity 23 at a given time period could then be selected.

Additionally or alternatively in some examples the goods and/or service requirements of the mobile entity 23 could be used to select the transaction entity 25. For instance, where the mobile entity 23 is a vehicle, the fuel level of a vehicle could be monitored and a transaction entity 25 could be selected based on the distance that the vehicle can travel before refueling is required.

Additionally or alternatively in some examples the availability of goods and/or services at the transaction stations 25 could be used to select a transaction station 25. For instance, where the mobile entity is a vehicle, the vehicle may require a place to park. The availability of parking locations within the area of the vehicle could be used to find the best place for the vehicle to park and the corresponding transaction station 25.

Once the transaction station 25 has been selected, at block 33, the method comprises assigning a one or more items of digital attributes from the digital attribute account associated with the mobile entity 23 to the transaction entity 25. Where the digital attribute account is a digital currency account the one or more items of digital attributes may comprise a quantity of digital currency. Where the digital attribute account is a digital authentication account the one or more items may comprise verification means such as certificates.

When the one or more items of digital attributes are assigned to the transaction entity 25 the assigned items are locked to the transaction entity 25 so that the assigned items can only be used for transactions between the mobile entity 23 and the selected transaction entity 25. This enables the mobile entity 23 to use items that have not been assigned to make other transactions with other transaction entity 25 but prevents the mobile entity 23 from using the assigned items. Where the digital attributes comprise digital currency this prevents double spending and fraudulent use of the digital currency.

Where the digital attributes comprise a digital currency the assigned quantity of digital currency enables a micropayment to be made between the mobile entity 23 and the transaction entity 25. The micropayment may be a transaction that occurs directly between the mobile entity 23 and the transaction entity 25 without going through the digital currency network 27. The network databases 30 may be updated only after one or more micropayments have been completed. A record of the micropayment transactions may be stored locally in the memory circuitry 7 of the mobile entity 23 and/or the transaction entity 25 and may be provided to the digital currency network 27 for verification after the transaction between the mobile entity 23 and the transaction entity 25 has been completed. This may enable the mobile entity 23 to disconnect from the transaction entity 25 and/or leave an area associated with the transaction entity 25 before a network database 30 is updated. The area associated with the transaction entity 25 could comprise the area in which the transaction entity 25 is located and some of the surrounding area. This enables quicker transactions between the transaction entities 25 and the mobile entities 23.

The assigning of one or more items of digital attributes to a transaction entity 25 may be temporary. The one or more items of digital attributes could be assigned to the transaction entity 25 for a predefined time period or could be assigned for the time period that the mobile entity 23 is within a specific area associated with the transaction entity 25. Once the time period has expired or the mobile entity 23 has left the specific area the one or more items of digital attributes could be retracted from the selected transaction entity 25. This may unlock the one or more items of digital attributes so that the mobile station 23 could then use the one or more items of digital attributes at any available transaction entity 25.

In some examples the quantity of digital currency could be reassigned to a new transaction entity 25. The reassigning of the different transaction entity 25 could happen automatically without any specific user input. The new transaction entity 25 could be selected using the same processes as used to select the original transaction entity 25. For instance, it may be determined that the mobile entity 23 has changed the route or has passed the selected transaction entity 25 or left the area associated with the transaction entity 25. In such cases the one or more items of digital attributes associated with the mobile entity 23 could be reassigned to the new transaction entity 25. Alternatively or additionally, in some examples if it is determined that the one or more items of digital attributes have not been used at the selected transaction entity 25 within a given time period a new transaction entity 25 could be selected for the mobile entity 23. Alternatively or additionally, in some instances, it may be determined that the mobile entity 23 has passed the transaction entity 25 without making a transaction. In such cases the one or more items of digital attributes associated with the selected transaction entity 25 could be retracted and reassigned to a new transaction entity 25.

In some examples of the disclosure the method of FIG. 3 could be implemented by the controlling circuitry 3 of an apparatus 1 of the mobile entity 23. In other examples different parts of the method could be performed by different parts of the system 21. For instance one or more network devices 29 could be used to identify and select the available transaction stations 25 and then inform the mobile entity 23 of the selected transaction station 25.

Figure 4:
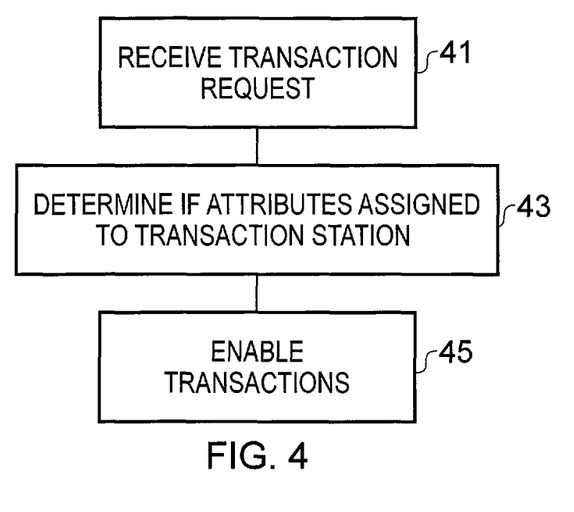
FIG. 4 illustrates an example method which could be implemented by an apparatus of a transaction station.

FIG. 4 illustrates an example method which could be implemented by an apparatus 1 of a transaction station 25.

At block 41 the method comprises receiving, at a transaction station 25, a request for a transaction from a mobile entity 23. The request could be received in response to a user input for instance a user of the mobile input may make a user input indicating that they wish to purchase goods and/or services. In other examples the request could be made automatically without any input being required from the user. For instance the request could be received in response to a detection that the mobile entity 23 is located at the transaction entity 25 or in an area associated with the transaction entity 25 or in response to any other suitable trigger event or combination thereof.

At block 43 the method comprises determining, by the transaction entity 25 if the mobile entity 23 making the request has a digital attribute account assigned to the transaction entity 25. Further, the transaction entity 25 may check a record 26 to determine if the digital attribute account comprising one or more items of digital attributes assigned to the transaction entity 25. In some examples the record 26 may be stored in the memory circuitry 7 of the transaction entity 25. In such cases the transaction entity 25 may determine that the mobile entity 23 has a digital attribute account assigned to the transaction entity 25, and may further determine that the digital attribute account comprises one or more items of digital attributes without having to access the digital attribute network 27. In other examples the transaction entity 25 may access a network device 27 to check a record 32 stored at the network device 29.

If it is determined that the mobile entity 23 has a digital attribute account assigned to the transaction entity 25, then, at block 45 one or more transactions between the mobile entity 23 and the transaction entity 25 using the one or more assigned items of digital attributes are enabled. Where the digital attributes comprise digital currency the transactions may comprise one or more micropayments.

A record of the transactions may be stored locally in the memory circuitry 7 of the mobile entity 23 and/or the transaction entity 25 and may be provided to the digital currency network 27 and the network database 30 for verification after the transaction between the mobile entity 23 and the transaction entity 25 has been completed. This may enable the network database 30 to be updated after the mobile entity 23 has disconnected from the transaction entity 25. Once the mobile entity 23 has disconnected from the transaction entity 25 the mobile entity 23 may leave the area associated with the transaction entity 25.

Figure 5:
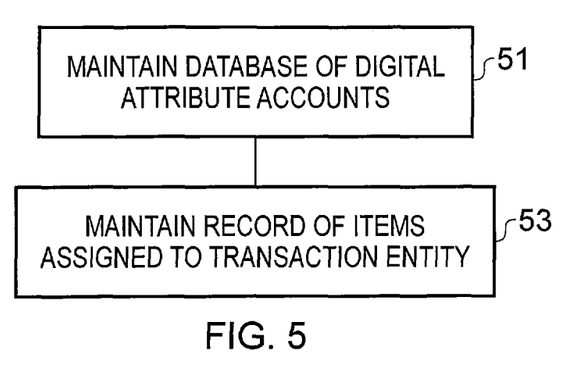
FIG. 5 illustrates an example method which could be implemented by an apparatus of a network device.

FIG. 5 illustrates an example method which could be implemented by an apparatus 1 of a network device 29.

The method comprises, at block 51 maintaining a database 30 of one or more digital attribute accounts. At least one digital attribute account is associated with a mobile entity 23. At least one digital attribute account is associated with a transaction entity 25. At least one same digital currency account is associated with one mobile entity 23 and one or more transaction entities 25. The database 30 may comprise information relating to the items of digital attributes available in each account. For instance, where the digital attributes comprise a digital currency the database 30 may comprise information relating to the amount of digital currency available in each account.

The database 30 may be updated after every transaction has been completed. The database 30 may be encrypted so that it can only be accessed by authorised entities.

At block 53, the method comprises maintaining a record 32 of at least one digital attribute account and one or more items of digital attributes that have been assigned between a mobile entity 23 and a selected transaction entity 25. Where the digital attributes comprise a digital currency the record 32 may comprise information indicative of quantities of digital currency assigned between a mobile entity 23 and a selected transaction entity 25. In some examples the transaction entity 25 could be selected by the network device 29. In other examples the transaction entity 25 could be selected by the mobile entity 23 and the mobile entity 23 may then send a communication to the network device 29 indicative of the selected transaction entity 25. Additionally, the selection of the transaction entity 25 may be updated based on the location of the mobile entity 23

Once the network device 29 has information indicative of the selected transaction entity 25 and the mobile entity 23 and the at least one digital attribute account and the one or more items of digital attributes to be assigned the network device 29 updates the record 32. The network device 29 may then control the transfer of the digital attributes so that the assigned one or more items of digital attributes can only be used at the selected transaction entity 25. In some examples the network device 27 may be configured to prevent the assigned one or more items of digital attributes from being spent at a different transaction entity 25 while they are assigned to the selected transaction entity 25.

The network device 29 may be arranged to update the record 32 whenever a transaction is completed or if a new transaction entity 25 is selected.

In some examples the network device 29 may be arranged to enable a transaction entity 25 to access the record 32 and determine whether or not at least one digital attribute account and one or more items of digital attributes have been assigned to the transaction entity 25. Additionally, the network device 29 may be arranged to enable one or more transaction entities 25 to access the record 32 and determine whether or not at least one digital currency account and/or a quantity of digital currency has been assigned to the one or more transaction entities 25.

Figure 6:
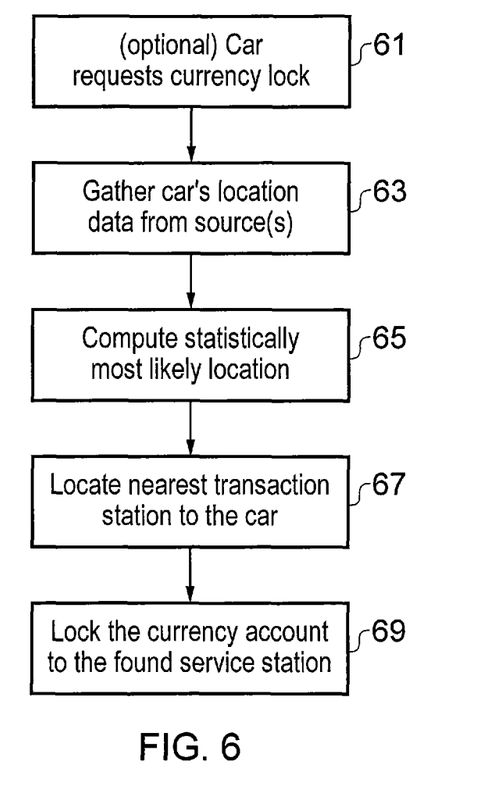
FIG. 6 illustrates another example method.

FIG. 6 illustrates another example method which may be used to assign digital currency from an account, such as a digital currency account, associated with a vehicle to a transaction entity 25. In the example of FIG. 6 the vehicle is a car such as an autonomous car. Other types of vehicles could be used in other examples of the disclosure. The method of FIG. 6 could be implemented using the systems 21 as described above.

At block 61 the car requests currency lock by assigning a quantity of digital currency on the account to a transaction entity 25. Block 61 may be optional and may be omitted in other implementations. In other examples the currency lock may be instigated automatically by determining that a trigger event has occurred. The trigger event could be the fuel level of the car dropping below a threshold or any other suitable event as described previously.

At block 63 the location data of the car is gathered from one or more sources. In some examples a single source could be used to determine the location of the car. For instance the car may comprise a location sensor 20 which may provide accurate and reliable information indicative of the location of the car. In other examples the location data could be gathered from a plurality of sources as described previously. For instance, a plurality of observation entities could be arranged to identify the car and provide information indicative of the current location of the car. At block 65 the gathered location data is used to compute the statistically most likely location, such as a next location, for the car.

At block 67 the method comprises locating the nearest transaction entity 25 to the car. The nearest transaction entity 25 could be the transaction entity 25 that has the smallest radial distance from the location of the car. Additionally or alternatively the direction in which the car is facing could be taken into account so that the nearest transaction entity 25 is the closest transaction entity 25 in the direction that the car is travelling. Additionally or alternatively, a speed in which the car is travelling can be taken into account when determining the nearest transaction entity 25 in the direction that the car is travelling. It is to be appreciated that, additionally or alternatively, other criteria for selecting the transaction entity 25 could be used in other examples of the disclosure as described previously.

At block 69 at least one digital currency account and/or a quantity of the digital currency account is assigned to the selected transaction entity 25 so that the account and/or the currency is locked to that transaction entity 25 and cannot be spent at other transaction entities 25. Once the account and/or currency are locked records 26, 32 indicative of the locked account and/or currency may be updated. The records could be stored at network devices 29 and/or transaction entities 25.

FIG. 7A to 7E illustrate an example of the methods described above in use. In the example of FIGS. 7A to 7E the mobile entity 23 is a vehicle 77 that requires good and/or services. For instance the vehicle 77 may require refueling, a battery charging, cleaning, an oil change, a tire change or replacement, and/or any goods and/or service, or any combination thereof. The transaction entities 25 in this example comprise fuel stations, battery charging stations, and/or maintenance stations. Other types of mobile entity 23, for example a mobile communication device, could be used in other examples of the disclosure. Alternatively or additionally other types of transaction entity 25, such as a toll booth or parking meter, could be used in other examples of the disclosure. Alternatively or additionally other goods and/or services could be used in other examples of the disclosure such as toll road payments or parking payments.

Figure 7A:
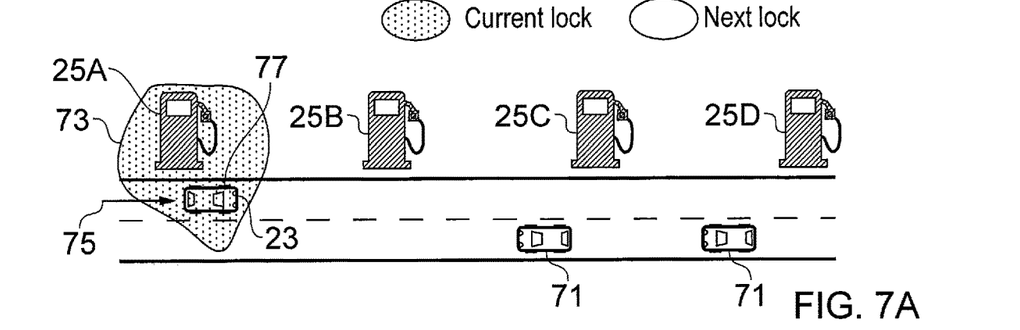
FIGS. 7A to 7E illustrate an example of the methods in use.

In FIG. 7A the vehicle 77 is travelling in the direction indicated by an arrow 75. The vehicle 77 has a digital currency account which may be shared between the one or more transaction entities 25 as indicated in FIG. 7A. A quantity of currency from the account associated with the vehicle 77 is locked to the first transaction entity 25A, that is, the selected transaction entity 25A. The first transaction entity 25A is the current closest transaction entity 25 to the vehicle 77. The quantity of digital currency may be locked to a geographical area so that the quantity of currency can only be spent when the vehicle 77 is located within the geographical area and connected to the first transaction entity 25. The geographical area is indicated by the grey area 73 in FIG. 7A. The first transaction entity 25A is comprised within the geographical area 73.

Figure 7B:
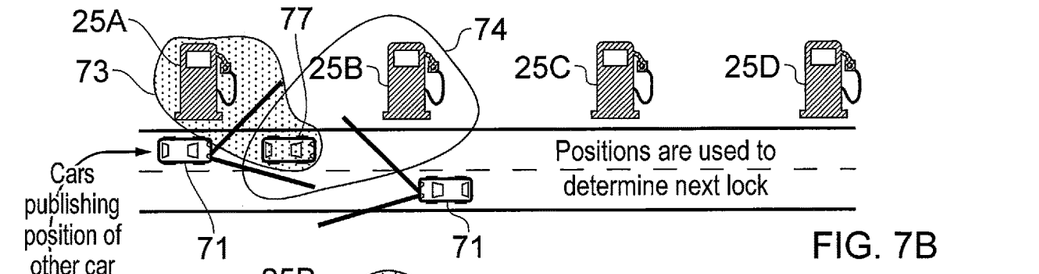

In FIG. 7B the vehicle 77 is moving away from the first transaction entity 25. In FIG. 7B the quantity of digital currency is still assigned to the first transaction entity 25A. However this assignment is now not beneficial to the vehicle 77 as it prevents the assigned quantity of digital currency from being spent at another transaction entity 25.

In FIG. 7B the new location of the vehicle 77 is used to select a new transaction entity 25. In FIG. 7B the new location of the vehicle 77 may be computed using location data and/or direction data provided from other vehicles 71. The location data and/or direction data may be provided in a vehicle-to-vehicle (V2V) manner. Using the location and/or direction data obtained from other vehicles 71 may provide more accurate location data and may make it harder for fraudulent location data to be used. Additionally or alternatively, the new location may be computed using location and/or direction data provided by any other technologies as described previously.

In FIG. 7B the next transaction entity 25 is being identified. The next transaction entity 25B is the next closest station in the direction in which the vehicle 77 is travelling. The next transaction entity 25B could be identified by one or more network devices 29 or by the vehicle 77. The geographical area in which it is determined that the next transaction entity 25B is located is indicated by the area 79 in FIG. 7B.

Figure 7C:
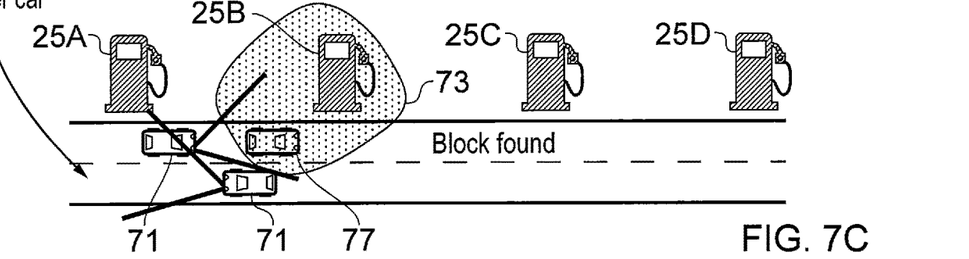
Figure 7D:
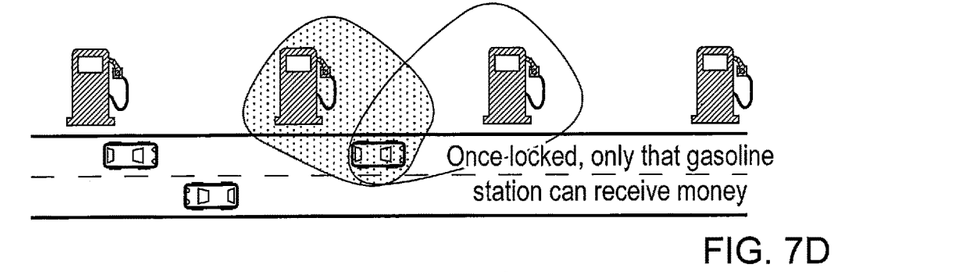

In FIG. 7C the next transaction entity 25B has been selected and the quantity of digital currency is assigned to the transaction entity 25B as indicted by the grey area 73.

In FIG. 7D the vehicle 77 again moves past the transaction entity 25B. The process described in FIGS. 7B and 7C is repeated so that the digital currency is assigned to the next transaction entity 25C.

Figure 7E:
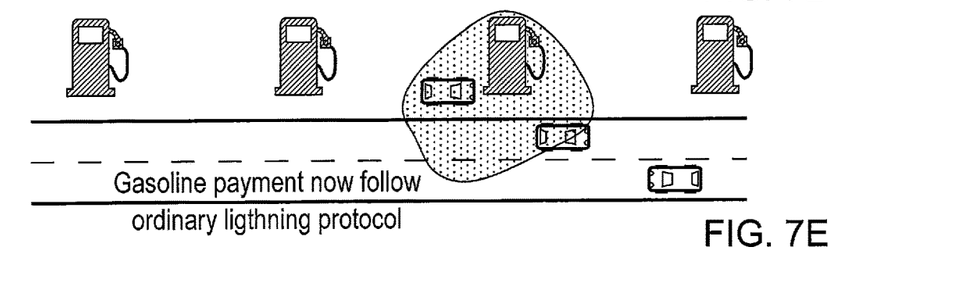

In FIG. 7E the vehicle 77 moves to the transaction entity 25C and obtains fuel. The fuel is paid for using the assigned quantity of digital currency. The fuel may be paid for by using one or more micropayments.

Figure 8:
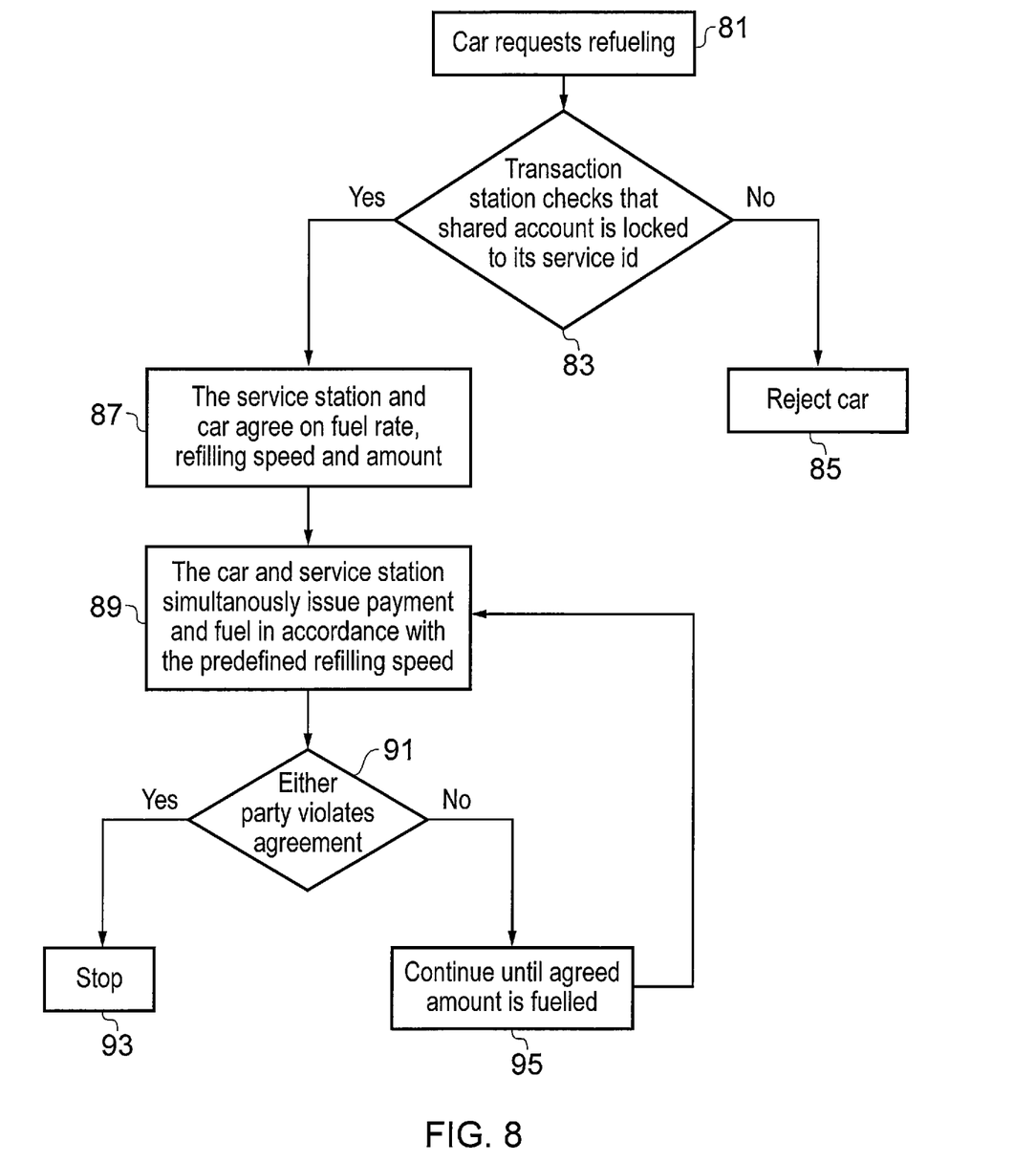
FIG. 8 illustrates another example method which may be used to enable a vehicle to be refueled.

FIG. 8 illustrates another example method which can be used to enable a vehicle to be refueled. In the example of FIG. 8 the vehicle is a car and the transaction entity 25 is a fuel station. Other types of vehicle or mobile entities 23 and transaction entities 25 may be used in other examples of the disclosure.

At block 81 the car has arrived at a transaction entity 25 and requests refueling. The request for refueling may be made automatically, for instance it may be made in response to a determination that the car is located in a refueling location. In other examples the request for refueling could be made in response to a user input at the vehicle.

In response to the request for refueling, at block 83 the transaction entity 25, checks whether or not the car has a digital currency accounts and/or quantity of digital currency assigned to the transaction entity 25. In the example of FIG. 8 a shared digital currency account may be provided between the car and one or more transaction entities 25. Each of the transaction entities 25 may have a unique service identification. The unique service identification enables the transaction entity 25 to identify the transaction entity 25 that the digital currency account and/or the digital currency is assigned to.

If it is determined that the digital currency account and/or the quantity of digital currency is assigned to a different transaction entity 25 then, at block 85 the transaction entity 25 rejects the car and prevents the transaction from being made.

If it is determined that the digital currency account and/or a quantity of digital currency is assigned to the current transaction entity 25 then the transaction entity 25 proceeds with the transaction. At block 87 the transaction entity 25 and the car agree on the terms of the transaction. The terms of the transaction could comprise the fuel rate, the refueling speed, the amount of fuel to be transferred or any other terms or conditions or any combinations thereof. In examples where the car is an electric car, the terms of the transaction could comprise a price of electricity, a recharging speed, a recharging voltage and current rates, a current type, a rate of electrical power, an amount of electricity to be transferred, or any other terms or conditions, or any combinations thereof. In case of a hybrid car, all the terms of the transaction described above can be comprised.

Once the terms of the transaction have been agreed upon by the car and the transaction entity 25 they issue the exchange of the fuel and/or the electricity and payment via the digital currency in accordance with the agreed terms and conditions. In some examples, they may issue the exchange of the fuel and/or the electricity, and payment via the digital currency substantially simultaneously.

At block 91 it is determined whether or not the car or the transaction entity 25 has violated any of the terms or conditions of the agreement. If it is determined that any of the terms and conditions have been violated that at block 93 the exchange is terminated. If it is determined that no violation has occurred then the transaction continues until the agreed amount of fuel and/or electricity has been provided to the car.

The transaction may comprise one or more micropayments. The one or more micropayments and the determination whether or not the car or the transaction entity 25 has violated any of the terms or conditions of the agreement enable the transaction to be terminated as described above. This may be useful where the transaction entity 25 and/or the vehicle are unreliable or not trusted. For example the transaction entity 25 could be someone's private electric car charging point which might not be as secure and reliable as a commercial refueling point. In such examples the assignment of the quantity of the digital currency ensures that the vehicle has sufficient funds to pay for the request fuel.

Additionally during the transaction the one or more micropayments may comprise small payments that are made from the vehicle in exchange for small amounts of fuel. The transaction entity 25 and the vehicle may record the micropayments locally without transmitting each micropayment to the network 27. This may enable the transaction to be completed more quickly.

As an example, during refueling the vehicle may sign a first transaction Tx1

> Tx1={pay(TO: FuelStation_ID,from: SHARED_FU-
> EL_ACCOUNT_ID),MICRO_AMOUNT_1,
> TIMESTAMP( )}[CAR_SIGNATURE]

FuelStation_ID is the unique identification of the transaction entity 25
SHARED_FUEL_ACCOUNT_ID is a unique identification of a digital currency account shared by the car and the transaction entity 25
MICRO_AMOUNT_1 is the first micropayment for the first bit of fuel;
TIMESTAMP( ) is the time of transaction generation
CAR_SIGNATURE is the cars unique signature which verifies the micropayment.

In such examples the timestamps (TIMESTAMP( )) may be used to chain a plurality of micropayments together into an indisputable order that both the vehicle and the transaction entity 25 agree on.

The transaction station 25 receives Tx1. The transaction station 25 does not transmit Tx1 to the network 27 but instead maintains a local record 26 of the transactions. Following the first transaction a second transaction Tx2 is signed by the vehicle to continue the exchange.

> Tx2={pay(TO: FuelStation_ID,from: SHARED_FU-
> EL_ACCOUNT_ID),MICRO_AMOUNT_1+
> MICRO_AMOUNT_2,TIMESTAMP( )}[CAR_
> SIGNATURE]

The second transaction Tx2 is similar to the first transaction Tx1, but the payment in the second transaction Tx2 is the cumulative amount so far.

In this example both the vehicle and the transaction entity 25 have the latest transaction so that either the vehicle and/or the transaction entity 25 can transmit the latest transaction to the digital currency network 27 for verification and addition to a block of transactions.

When the fuel exchange is completed, the final transaction is broadcast onto the to the digital currency network 27 by the vehicle and/or the transaction entity 25. As both the vehicle and the transaction entity 25 can transmit the final transaction this prevents either entity from trying to claim the incorrect value of digital currency. For instance that amount the vehicle may claim has been transferred can be checked against the amount that the transaction s entity 25 reports to have been transferred.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, the method comprising:
selecting, by one or more processors of an autonomous vehicle, a first transaction entity among one or more transaction entities for the vehicle in response to a trigger event, wherein the trigger event comprises:
  detecting that the vehicle has entered a geographic area associated with a predicted route of the vehicle and the one or more transaction entities; and
  detecting a fuel level or battery storage level of the vehicle is below a threshold value;
storing at least one local record at the vehicle, the first transaction entity, or a combination thereof before the vehicle arrives at the first transaction entity, wherein one of the at least one local record pre-assigns one or more items of digital attributes from a digital attribute account associated with the vehicle to the first transaction entity;
determining, by the one or more processors, whether the vehicle has made a transaction of at least a portion of the one or more items of the digital attributes with the first transaction entity;
when the transaction is made, transmitting to a network database at least one timestamp associated with the transaction to store the transaction with a plurality of other transactions in a blockchain; and
selecting, by the one or more processors, a second transaction entity among one or more new transaction entities for the vehicle in response to a second trigger event, wherein the second trigger event comprises:
  detecting that the vehicle has left the geographic area and entered a new geographic area associated with the predicted route of the vehicle and the one or more new transaction entities;
  based on the determining, retracting a remaining portion of the one or more items of the digital attributes assigned to the first transaction entity, and updating local records associated with the vehicle, the first transaction entity and the second transaction entity and reassigning the one or more items of digital attributes to the second transaction entity before the vehicle arrives at the second transaction entity; and repeatedly selecting one or more other transaction entities subsequent to the second transaction entity based on the second trigger event along the predicted route of the vehicle for making and storing in the blockchain one or more transactions subsequent to the first transaction.

2. The method of claim 1, further comprising:

transmitting to the first transaction entity a signature of the vehicle signed for the transaction, wherein the first transaction entity authenticates the signature with the network database, wherein the assigned one or more items can only be used for transactions between the vehicle and the first transaction entity when on the geographic area, and wherein the assigned one or more items can only be used for transactions between the vehicle and the second transaction entity when on the new geographic area.

3. The method of claim 1, wherein the one or more items of digital attributes are temporarily assigned to the first transaction entity with on an expiration time from a current time, and wherein the remaining portion of the one or more items of digital attributes are reassigned to the second transaction entity when the expiration time has passed.

4. The method of claim 1, further comprising:

restricting transactions from the digital attribute account associated with the vehicle so that the one or more items of digital attributes assigned to the first transaction entity cannot be used at any other transaction entity.

5. The method of claim 1, wherein the remaining portion of the one or more items of digital attributes are temporarily reassigned to the second transaction entity with another expiration time from a subsequent time.

6. The method of claim 1, further comprising:

updating the selected second transaction entity by selecting a further transaction entity;

retracting the one or more items of digital attributes associated with the selected second transaction entity; and reassigning one or more items of digital attributes to the further transaction entity.

7. The method of claim 1, wherein the first transaction entity is further selected based on a current location of the vehicle.

8. The method of claim 1, wherein the current location of the vehicle is obtained using at least one of: one or more location sensors on the vehicle, one or more observations from an external observation entity, or using location data or direction data provided from other vehicles.

9. The method of claim 1, wherein the vehicle comprises identification means which enables the vehicle and the digital attribute account associated with the vehicle to be identified, and wherein the network database is a distributed database.

10. The method of claim 1, wherein the assigned one or more items comprise a quantity of digital currency and the quantity of digital currency enables a micropayment to be made between the vehicle and the first transaction entity to complete the transaction and the vehicle can disconnect from the first transaction entity before the network database is updated.

11. The method of claim 10, further comprising:

facilitating the micropayment using a lightning protocol;

maintaining a local record of the micropayment; and transmitting the record to a digital currency network after the vehicle has disconnected from the first transaction entity, wherein the digital currency network connects with the network database, and the digital currency network checks the record from the vehicle against a record from the first transaction entity to verify the transaction.

12. An apparatus comprising processing circuitry, and memory circuitry including computer program code, the memory circuitry and the computer program code configured to, with the processing circuitry, cause the apparatus embedded in an autonomous vehicle to:

select a first transaction entity among one or more transaction entities for the vehicle in response to a trigger event, wherein the trigger event comprises:

detecting that the vehicle has entered a geographic area associated with a predicted route of the vehicle and the one or more transaction entities; and detecting a fuel level or battery storage level of the vehicle is below a threshold value;

store at least one local record at the vehicle, the first transaction entity, or a combination thereof before the vehicle arrives at the first transaction entity, wherein one of the at least one local record pre-assigns one or more items of digital attributes from a digital attribute account associated with the vehicle to the first transaction entity;

determine whether the vehicle has made a transaction of at least a portion of the one or more items of the digital attributes with the first transaction entity;

when the transaction is made, cause a transmission to a network database at least one timestamp associated with the transaction to store the transaction with a plurality of other transactions in a blockchain; and select a second transaction entity among one or more new transaction entities for the vehicle in response to a second trigger event, wherein the second trigger event comprises:

detecting that the vehicle has left the geographic area and entered a new geographic area associated with the predicted route of the vehicle and the one or more new transaction entities; and based on the determining, retracting a remaining portion of the one or more items of the digital attributes assigned to the first transaction entity, and updating local records associated with the vehicle, the first transaction entity and the second transaction entity and reassigning the one or more items of digital attributes to the second transaction entity before the vehicle arrives at the second transaction entity; and repeatedly select one or more other transaction entities subsequent to the second transaction entity based on the second trigger event along the predicted route of the vehicle for making and storing in the blockchain one or more transactions subsequent to the first transaction.

13. The apparatus according to claim 12, wherein the first transaction entity is further selected based on a current location of the vehicle.

14. The apparatus according to claim 12, wherein the assigned one or more items can only be used for transactions between the vehicle and the first transaction entity.

15. The apparatus according to claim 12, wherein the one or more items of digital attributes are temporarily assigned to the first transaction entity with on an expiration time from a current time, and wherein the remaining portion of the one or more items of digital attributes are reassigned to the second transaction entity when the expiration time has passed.

16. The apparatus according to claim 12, further configured to:
   restrict transactions from the digital attribute account associated with the vehicle so that the one or more items of digital attributes assigned to the first transaction entity cannot be used at any other transaction entity.

17. The apparatus of claim 12, wherein the first transaction entity is nearest to the vehicle when the one or more items of digital attributes are pre-assigned.

18. The apparatus of claim 12, wherein the detection that the vehicle has entered the geographic area is based on a global navigation satellite system (GNSS) sensor in the vehicle.

19. The method of claim 1, wherein the first transaction entity is nearest to the vehicle when the one or more items of digital attributes are pre-assigned.

20. The method of claim 1, wherein the detecting that the vehicle has entered the geographic area is based on a global navigation satellite system (GNSS) sensor in the vehicle.

* * * * *